(12) United States Patent
Letourneur

(10) Patent No.: US 8,112,571 B1
(45) Date of Patent: Feb. 7, 2012

(54) SIGNAL CONNECTION DEVICE AND METHOD

(75) Inventor: Herve Letourneur, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 172 days.

(21) Appl. No.: 12/508,349

(22) Filed: Jul. 23, 2009

(51) Int. Cl.
*G06F 13/40* (2006.01)
*G06F 13/36* (2006.01)

(52) U.S. Cl. .......................... 710/311; 710/306

(58) Field of Classification Search .................... 710/316
See application file for complete search history.

(56) References Cited

U.S. PATENT DOCUMENTS

| | | | |
|---|---|---|---|
| 6,253,329 B1 | 6/2001 | Kang | |
| 6,272,644 B1 | 8/2001 | Urade et al. | |
| 6,334,160 B1 | 12/2001 | Emmert et al. | |
| 6,957,292 B2 | 10/2005 | Croyle | |
| 7,073,010 B2 | 7/2006 | Chen et al. | |
| 7,124,233 B2 | 10/2006 | Tang | |
| 7,478,191 B2 | 1/2009 | Wurzburg et al. | |
| 7,480,753 B2 | 1/2009 | Bohm et al. | |
| 7,502,878 B1 | 3/2009 | Wright | |
| 7,779,184 B2 * | 8/2010 | Hubert et al. | 710/74 |
| 2006/0097749 A1 * | 5/2006 | Ahmad et al. | 326/30 |
| 2008/0228986 A1 * | 9/2008 | Lodolo | 710/313 |
| 2008/0270663 A1 * | 10/2008 | Fry et al. | 710/301 |
| 2009/0006681 A1 * | 1/2009 | Hubert et al. | 710/74 |
| 2009/0043936 A1 * | 2/2009 | Yang et al. | 710/304 |

OTHER PUBLICATIONS

Cypress Semiconductor Corporation, CY7C656xx EZ-USB HX2LP Low-Power USB 2.0 Hub Controller Family—Data Sheet, Feb. 10, 2009.

* cited by examiner

*Primary Examiner* — Ryan Stiglic

(57) ABSTRACT

A device may include a first data path coupled between a first port and a data transfer section that enables data paths between the first data path and at least a second port and a third port. A second data path may be coupled between the first port and the second port that bypasses the data transfer section and is not coupled to the second or third ports.

20 Claims, 7 Drawing Sheets

SIGNAL CONNECTION DEVICE AND METHOD

TECHNICAL FIELD

The present disclosure relates generally to devices that create data communication paths between one point and multiple other points, and more particularly to devices that enable a host device to communicate with multiple other non-host devices.

DETAILED DESCRIPTION

Various embodiments will now be described that show devices and methods for connecting one communication port with a number of other communication ports.

Figure 1:
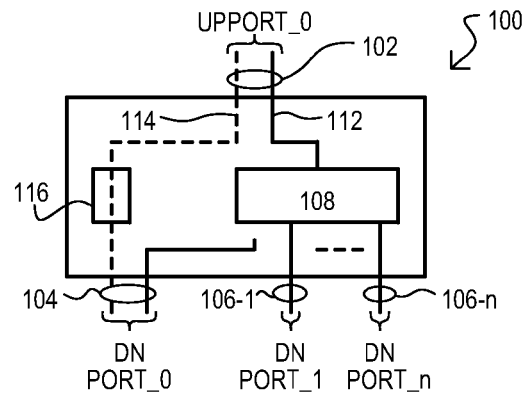
FIG. 1 is a block schematic diagram of a device according to a first embodiment.

Referring to FIG. 1, a device according to a first embodiment is shown in a block schematic diagram and designated by the general reference character 100. A device 100 may include an "upstream" port 102, a first downstream port 104, and a number of other downstream ports 106-1 to 106-n, as well as a data transfer section 108. A port may be an access point of a device for receiving and/or transmitting data values.

In the embodiment of FIG. 1, communications may flow between any of downstream ports 104, 106-1 to 106-n and upstream port 102. In one very particular embodiment, an upstream port 102 may be in the communication direction of a host device (not shown), while downstream ports (104, 106-1 to 106-n) may be in the direction of non-host devices (devices that communicate with a host device, referred to hereinafter as end point devices). A host device may control communications with end point devices.

Data at an upstream port 102 may be split along a first signal path 112 and a second signal path 114. A first signal path 112 may be connected between upstream port 102 and data transfer section 108. Data transfer section 108 may connect first signal path 112 to any of downstream ports 104, 106-1 to 106-n. A data transfer section 108 may include circuits for providing connections between one point (e.g., first signal path 112) and multiple other points (e.g., downstream ports 504, 506-1 to 506-n). As a few of the many possible examples, a data transfer section 108 may include multiplexing circuits, de-multiplexing circuits, buffers, switching logic and control logic for controlling such data transfers.

A second signal path 114 may be connected between upstream port 102 and downstream port 104. Second signal path 114 may bypass data transfer section 108, and in the embodiment shown, may not be connected to any of downstream ports 106-1 to 106-n. In such an arrangement, downstream ports 106-1 to 106-n may provide a subset of signal paths originating at upstream port 102. In contrast, downstream port 104 may provide a same set of signal paths as those originating at upstream port 102. In one embodiment, a signal path 114 may provide a direct connection between upstream port 102 and downstream port 104. In an alternate embodiment, a second signal path 114 may include a function circuit 116. A function circuit 116 may perform predetermined operations on data transfers through second signal path 114. Such operations may include, but are not limited to, signal conditioning of signals passing along such a path (i.e., signal repeater or amplifier), sensing activity on such paths, or controlling an impedance of one or more conductive lines within such a path.

In this way, a device may include an upstream port and a number of downstream ports, where selected downstream ports have a connection to only a subset of the data paths arriving at the upstream port.

Figure 2:
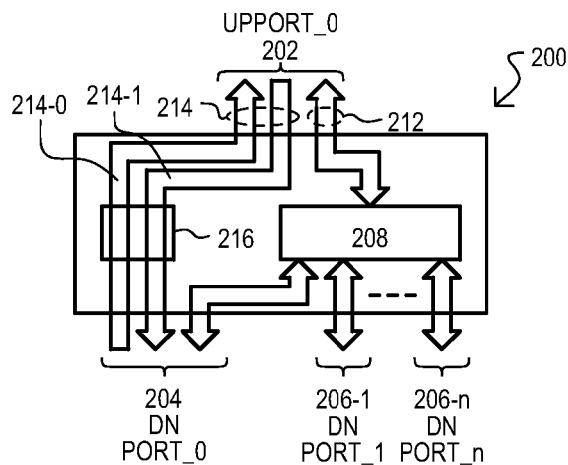
FIG. 2 is a block schematic diagram of a device according to another embodiment.

Referring now to FIG. 2, a device according to another embodiment is shown in a block schematic diagram and designated by the general reference character 200. In one very particular embodiment, a device 200 may be one particular example of that shown in FIG. 1.

A device 200 may include an upstream port 202, a first downstream port 204, a number of other downstream ports 206-1 to 206-n, as well as a data transfer section 208. Data at an upstream port 202 may be divided into a first signal path 212 and a second signal path 214.

A first signal path 212, in combination with data transfer section 208, may provide bi-directional signal paths between upstream port 202 and downstream ports 204, 206-1 to 206-n. In one particular embodiment, an upstream port 202 may include one or more conductive connections on which data may be received from the direction of a host device or transmitted toward a host device. Downstream ports 204, 206-1 to 206-n may each also include one or more conductive connections on which data may be received from the direction of an end point device, or transmitted toward an end point device. First signal path 212 and data transfer section 208 may allow data paths to be created between such conductive connections to enable data to flow from upstream port 202 to any of downstream ports 204, 206-1 to 206-n, or vice versa.

Second signal path 214 may include a first uni-directional signal path 214-0 and a second uni-directional signal path 214-1, separate from one another. In the particular embodiment of FIG. 2, a first uni-directional signal path 214-0 may transfer data from downstream port 204 to upstream port 202, while a second uni-directional signal path 214-1 may transfer data from upstream port 202 to downstream port 204. In one particular embodiment, first uni-directional signal path 214-0 may enable a data path for data received on input conductive connections at downstream port 204 to be transferred to output conductive connections of upstream port 202. A second uni-directional signal path 214-1 may enable a data path for data received on input conductive connections at upstream port 202 to be transferred to output conductive connections of downstream port 204.

Optionally, a second signal path 214 may include a function circuit 216. A function circuit 216 may perform predetermined operations on first uni-directional signal path 214-0, second uni-directional signal path 214-1, or both. Such predetermined operations may include, without limitation, those noted for function circuit 116 of FIG. 1, and equivalents.

In this way, a device may provide bi-directional data paths between an upstream port and multiple downstream ports, and separately provide uni-directional data paths between the upstream port and one of the downstream ports that is also connected to a bi-directional data path.

Figure 3:
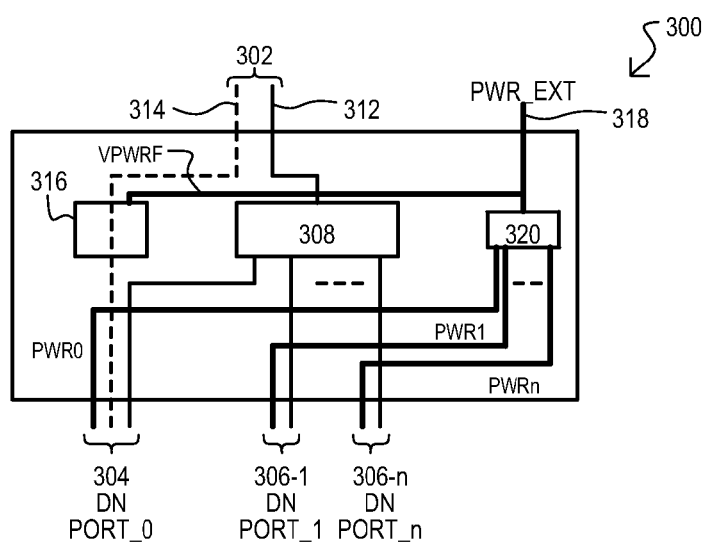
FIG. 3 is a block schematic diagram of a device according to a further embodiment.

Referring now to FIG. 3, a device according to another embodiment is shown in a block schematic diagram and designated by the general reference character 300. In one very particular embodiment, a device 300 may be one particular example of that shown in FIG. 1 and/or FIG. 2.

A device 300 may include some items like those shown in FIG. 1. Such like items are referred to by the same reference character but with a first digit being a "3" instead of a "1".

The embodiment of FIG. 3 shows a device 300 that may be self-powered and provide power to downstream ports 304 and 306-1 to 306-n. A device 300 may be considered self-powered as it may include an external power input 318 and a power regulation circuit 320, as opposed to receiving power via port. A power regulation circuit 320 may receive power from external power input 318, and in response, provide output power PWR0 to downstream port 304, and output power PWR1 to PWRn to downstream ports 306-1 to 306-n, respectively. It is noted that in particular embodiments, power may also be received at upstream port 302 and provided to power regulation circuit 320. However, such an upstream port power supply is not used as a sole source of power for downstream ports 304, 306-1 to 306-n.

Optionally, a second signal path 314 within device 300 may include a function circuit 316. A function circuit 316 may perform predetermined operations on second signal path 314 including, without limitation, those noted for function circuit 116 of FIG. 1 and equivalents. In such an embodiment, a power regulation circuit 320 may provide a function power VPWRF to a function circuit 316. In a particular embodiment, a second signal path 314 may have greater power requirements than signal paths created with first signal path 312 and/or data transfer section 308, and power connection VPWRF may provide such power.

In this way, a device may connect data paths at an upstream port to one downstream port, and connect a subset of the data paths at an upstream port to multiple other downstream ports, and provide power from an external power source to the downstream ports.

Figure 4:
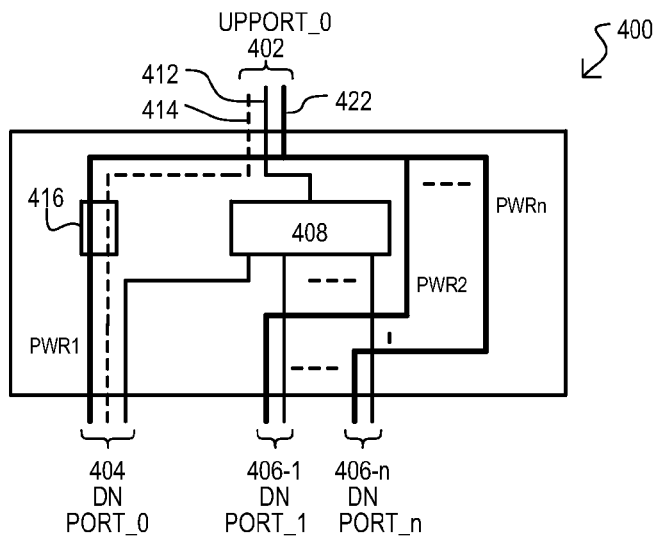
FIG. 4 is a block schematic diagram of a device according to another embodiment.

Referring now to FIG. 4, a device according to a further embodiment is shown in a block schematic diagram and designated by the general reference character 400. In one very particular embodiment, a device 400 may be one particular example of that shown in FIG. 1 and/or FIG. 2.

A device 400 may include some items like those shown in FIG. 1. Such like items are referred to by the same reference character but with a first digit being a "4" instead of a "1".

The embodiment of FIG. 4 shows a device 400 that may be bus powered. A device 400 may receive power at upstream port 202 on a port power connection 422. Power from port connection 422 may provide output power PWR0 to downstream port 404, and output power PWR1 to PWRn to downstream ports 406-1 to 406-n, respectively.

In this way, a device may connect data paths at an upstream port to one downstream port, and connect a subset of the data paths at an upstream port to multiple other downstream ports, as well as provide power received at the upstream port to the downstream ports.

Figure 5:
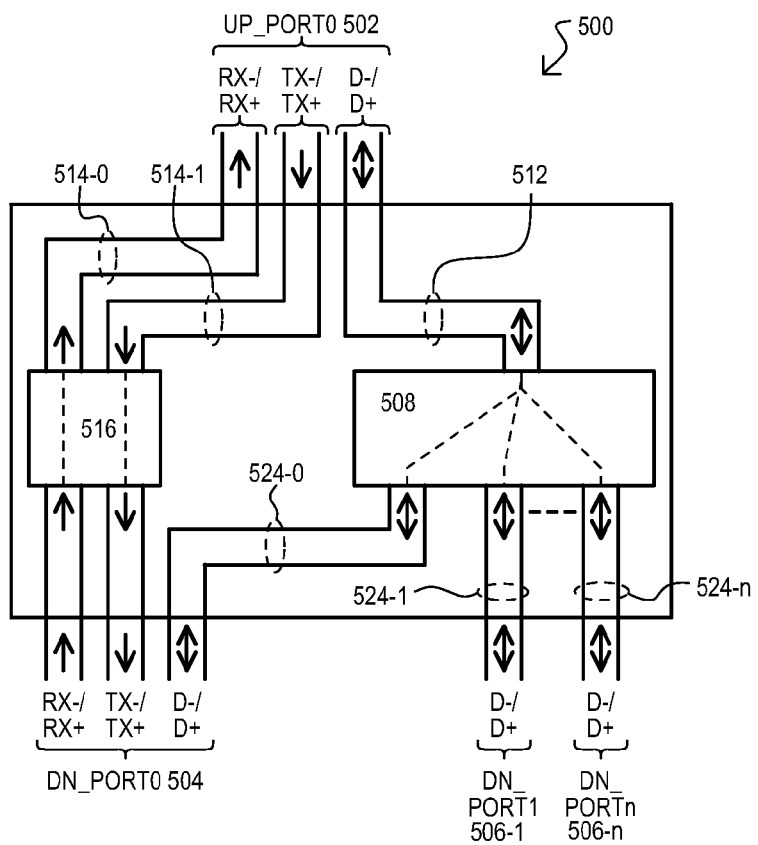
FIG. 5 is a block schematic diagram of a device according to still another embodiment.

Referring now to FIG. 5, a device according to a further embodiment is shown in a block schematic diagram and designated by the general reference character 500. In one very particular embodiment, a device 500 may be one particular example of that shown in any of FIGS. 1 to 4.

A device 500 may include some items like those shown in FIG. 2. Such like items are referred to by the same reference character but with a first digit being a "5" instead of a "2".

In the embodiment of FIG. 5, a first signal path 512 may be a bi-directional serial data path that includes two signal lines D−/D+ that provide differential data values. Differential data values may indicate a particular value based on a predetermined difference in potential between the lines D−/D+. Further, a data transfer section 508 may be connected to downstream ports 504, 506-1 to 506-n by downstream bi-directional serial data paths 524-0, 524-1 to 524-n, respectively.

In contrast to first signal path 512, second signal path 514 may include two uni-directional signal paths (514-0 and 514-1) that each includes two signal lines. First uni-directional signal path 514-0 may include two signal lines RX−/RX+ that transfer data from downstream port 504 toward upstream port 502. Second uni-directional signal path 514-1 may include two signal lines TX−/TX+ that transfer from upstream port 502 toward downstream port 504.

Optionally, a second signal path 514 may include a function circuit 516. A function circuit 516 may perform predetermined operations on any of the signal lines within first uni-directional signal path 514-0, second uni-directional signal path 514-1, or both. Such predetermined operations may include, without limitation, those noted for function circuit 116 of FIG. 1 and equivalents.

In this way, a device may split multiple, two-wire unidirectional signal paths at an upstream port away from a two-wire bi-directional signal path. The two-wire bi-directional signal path may be connected to multiple downstream ports, including a downstream port connected to the uni-directional signal paths, and downstream ports not connected to the uni-directional signal paths.

Figure 6:
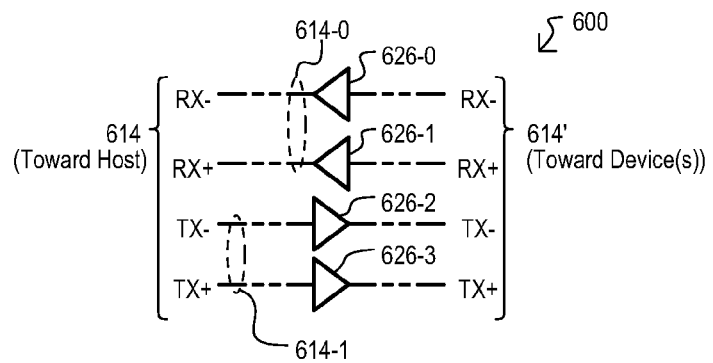
FIG. 6 is a schematic diagram of one example of a function circuit that may be included in embodiments.

Referring now to FIG. 6, a function circuit that may be included in the embodiments is shown in a schematic diagram and designated by the general reference character 600. A function circuit may amplify data signals along a second signal path, such as any of those shown as 114, 214, 314, 414 or 514 in FIGS. 1 to 5.

A function circuit 600 may be connected to a second signal path 614 from an upstream port direction, and provide a modified second signal path 614' in a downstream port direction. In the very particular example of FIG. 6, a second signal path 614 and modified second signal path 614' may include two, two-wire uni-directional signal paths 614-0 and 614-1. First uni-directional signal path 614-0 may be a data receive path including lines RX− and RX+. Second uni-directional signal path 614-1 may be a data transmit path including lines TX− and TX+.

A function circuit 600 may include signal repeaters 626-0 to 626-3 that may amplify signals transmitted through second path 614. In the particular embodiment shown, signal repeaters 626-0/1 may amplify signals on lines RX−/RX+, respectively, of modified second signal path 614' to drive signals on lines RX−/RX+ of second signal path 614. In an opposite signal direction, signal repeaters 626-2/3 may amplify signals on lines TX−/TX+, respectively, of second signal path 614 to drive signals on lines TX−/TX+ of modified second signal path 614'.

In this way, a function circuit may include signal repeaters for amplifying one or more signals along a second signal path between an upstream port and a downstream port that bypasses a data transfer section for bi-directional signal paths.

Figure 7:
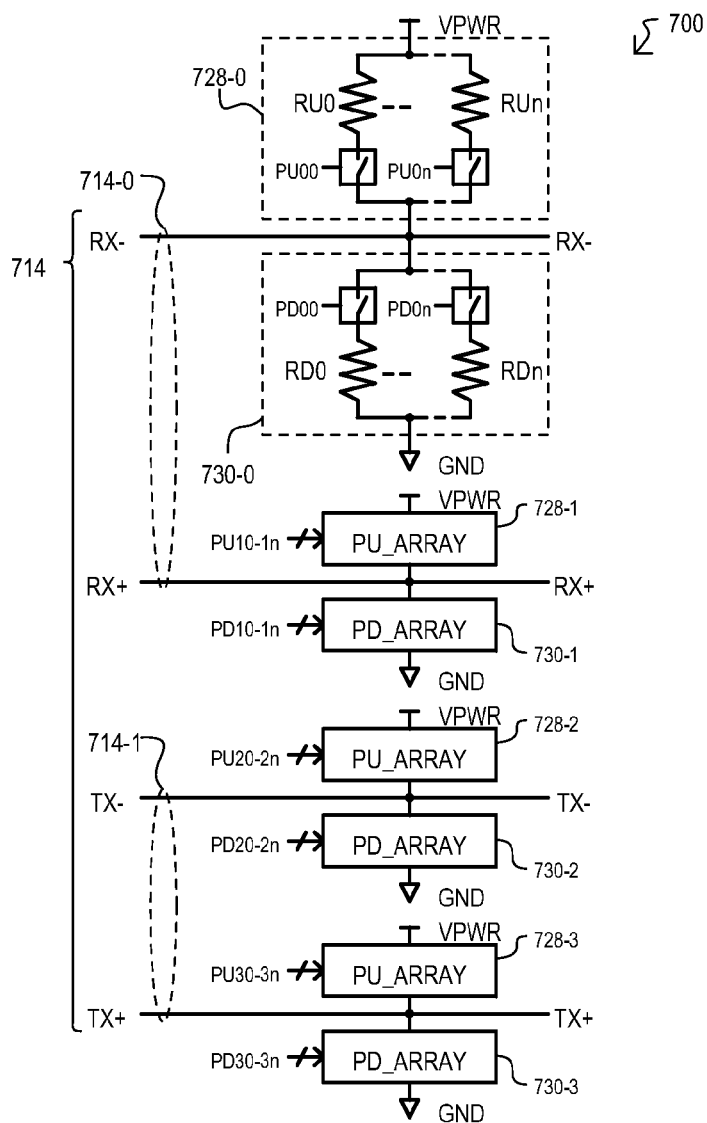
FIG. 7 is a schematic diagram of another example of a function circuit that may be included in embodiments.

Referring now to FIG. 7, another function circuit that may be included in the embodiments is shown in a schematic diagram and designated by the general reference character 700. A function circuit may alter an impedance of signal lines within a second signal path such as any of those shown as 114, 214, 314, 414 or 514 in FIGS. 1 to 5. In particular embodiments, such impedance changes may allow for impedance matching with external lines connected to a device.

In the particular embodiment of FIG. 7, a function circuit 700 may be connected to a second signal path 714 that includes two, two-wire uni-directional signal paths 714-0 and 714-1. First uni-directional signal path 714-0 may be a data receive path including lines RX− and RX+. Second uni-directional signal path 714-1 may be a data transmit path including lines TX− and TX+.

Also in the particular embodiment of FIG. 7, a function circuit 700 may include programmable pull-up arrays 728-0 to 728-3 connected to lines RX−, RX+, TX− and TX+, respectively, as well as programmable pull-down arrays 730-0 to 730-3 connected to lines RX−, RX+, TX− and TX+, respectively. As shown by programmable pull-up array 728-0, in response to control signals PU00 to PU0n, a programmable pull-up array 728-0 may selectively connect one or more resistances (e.g., RU0 to RUn) between its corresponding signal line (in this case RX−) and a first power supply node VPWR. As shown by programmable pull-down array 730-0, in response to control signals PD00 to PD0n, a programmable pull-up down array may selectively connect one or more resistances (e.g., RD0 to RDn) between its corresponding signal line (in this case RX−) and a low power supply node (e.g., ground GND).

In this way, a function circuit may include impedance matching on one or more signal lines of a second signal path between an upstream port and a downstream port, where such a second signal path bypasses a data transfer section for bi-directional signal paths.

Figure 8:
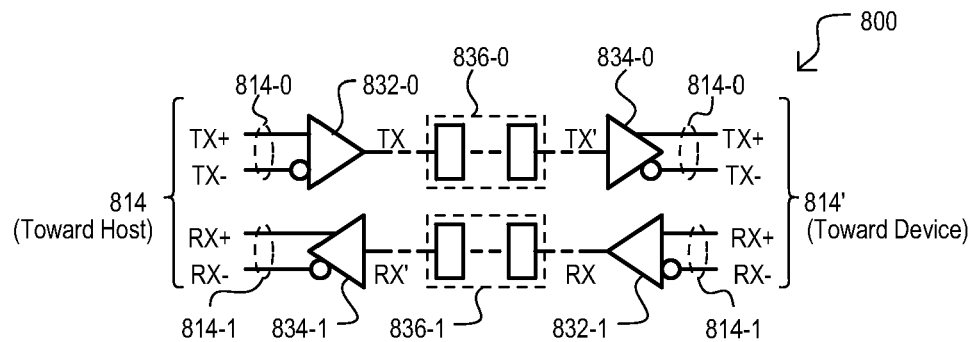
FIG. 8 is a schematic diagram of a further example of a function circuit that may be included in embodiments.

Referring now to FIG. 8, another function circuit that may be included in the embodiments is shown in a schematic diagram and designated by the general reference character 800. A function circuit may convert differential input signals to internal single ended signals, and then back to differential output signals. A function circuit 800 may be included in a second signal path, such as any of those shown as 114, 214, 314, 414 or 514 in FIGS. 1 to 5.

A function circuit 800 may be connected to a second signal path 814 from an upstream port direction, and provide a modified second signal path 814' in a downstream port direction. In the very particular example of FIG. 8, a second signal path 814 and modified second signal path 814' may include two, two-wire uni-directional signal paths 814-0 and 814-1. First uni-directional signal path 814-0 may be a data receive path including lines RX− and RX+. Second uni-directional signal path 814-1 may be a data transmit path including lines TX− and TX+.

A first uni-directional signal path 814-0 may include a transmit input differential amplifier 832-0, a transmit output differential driver 834-0, and optionally, a transmit intermediate circuit 836-0. Transmit input differential amplifier 832-0 may receive differential data signals on lines TX+/T− from a host direction, and may output single ended transmit data values TX. A single ended data value is understood to include a single signal (e.g., voltage or current) that varies with respect to a reference value (e.g., ground or some other reference voltage). Single ended transmit data values TX' may be received by transmit output differential driver 834-0, which may drive such single ended values as differential data values on lines TX+ and TX− of modified second signal path 814'. Optional transmit intermediate circuit 836 may propagate single ended data values between transmit input differential amplifier 832-0 and transmit output differential driver 834-0. As but a few examples, intermediate circuit 836-0 may include one or more latches and/or one or more clocked data registers.

A second uni-directional signal path 814-1 may include a receive input differential amplifier 832-1, a receive output differential driver 834-1, and optionally, a receive intermediate circuit 836-1. Receive input differential amplifier 832-1 may receive differential data signals on lines RX+/R− from an endpoint device direction, and may output single ended transmit data values RX. A single ended transmit data values RX' may be received by receive output differential driver 834-1, which may drive such single ended values as differential data values on lines RX+ and RX− of second signal path 814. Optional receive intermediate circuit 836-1 may propagate single ended data values between receive input differential amplifier 832-1 and receive differential driver 834-1. As but a few examples, intermediate circuit 836-1 may include one or more latches and/or one or more clocked data registers.

In this way, a function circuit may convert between differential signals and single ended signals of one or more unidirectional signal paths between an upstream port and a downstream port, where such unidirectional signal paths bypass a data transfer section for bi-directional signal paths.

Figure 9A:
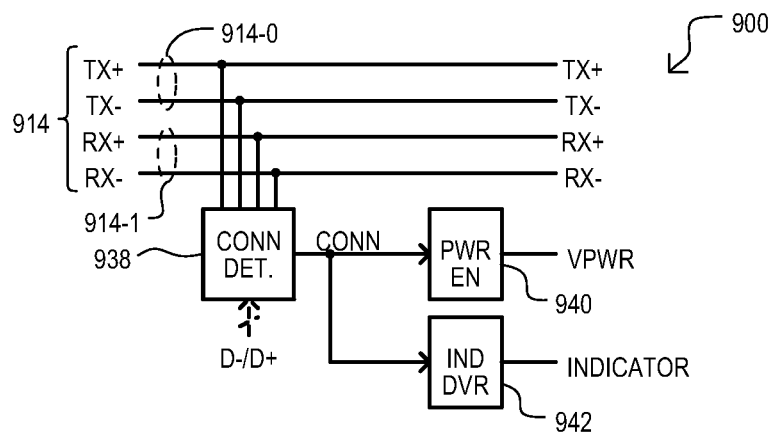
FIGS. 9A and 9B are block schematic diagrams of still other examples of function circuits that may be included in embodiments.

Referring now to FIG. 9A, still another function circuit that may be included in the embodiments is shown in a schematic diagram and designated by the general reference character 900. A function circuit may detect a status of a second signal path, such as any of those shown as 114, 214, 314, 414 or 514 in FIGS. 1 to 5.

A function circuit 900 may be connected to lines of a second signal path, and if such lines are at predetermined potentials, generate a detect connection value that indicates a device (e.g., end point device) is connected to the signal path. In the very particular example of FIG. 9, a second signal path 914 may include two, two-wire uni-directional signal paths 914-0 and 914-1. First uni-directional signal path 914-0 may be a data receive path including lines RX− and RX+. Second uni-directional signal path 914-1 may be a data transmit path including lines TX− and TX+.

A function circuit 900 may include connection detect circuit 938 connected to signal lines of second signal path 914. In the embodiment shown, connection detect circuit 938 may be connected to lines TX−, TX+, RX−, RX+ and may output a connection detect signal CONN based on voltages of such lines. In this way, a function circuit 900 may make a determination if a device is connected to a second signal path. Such a determination may be logically combined with a connection determination of a bi-directional data path (e.g., D+/D−) to establish an overall connection with respect to a downstream port.

In FIG. 9, a function circuit 900 may also include a power enable circuit 940 and an indicator driver circuit 942. A power enable circuit 940 may enable power to a particular downstream port based on a connection detect signal CONN (and optionally values on a bi-directional data path D−/D+ of a same port). Similarly, an indicator driver circuit 942 may output an indicator driver value INDICATOR based on a connection detect signal CONN (and optionally values on a bi-directional data path D−/D+ of a same port). A value INDICATOR may enable an indicator to be activated to visually indicate a status of the downstream port (e.g., may provide an LED current source).

In this way, a function circuit may determine a connection status of one or more uni-directional data paths between an upstream port and a downstream port, where such uni-directional data paths bypass a data transfer section for bi-directional signal paths.

Figure 9B:
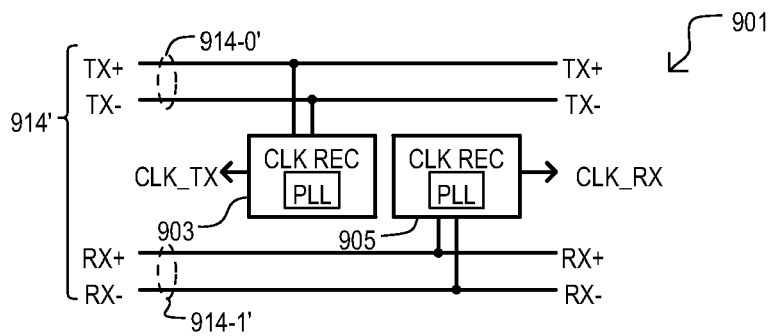

Referring now to FIG. 9B, still another function circuit that may be included in the embodiments is shown in a schematic diagram and designated by the general reference character 901. A function circuit may detect a status of a second signal path, such as any of those shown as 114, 214, 314, 414 or 514 in FIGS. 1 to 5.

A function circuit 901 may be connected to lines of a second signal path, and based on voltage transitions of such paths, derive a clock speed for data on such a signal path. In the very particular example of FIG. 9, a second signal path 914' may include two, two-wire uni-directional signal paths 914-0' and 914-1'. First uni-directional signal path 914-0' may be a data receive path including lines RX− and RX+. Second uni-directional signal path 914-1' may be a data transmit path including lines TX− and TX+.

A function circuit 900 may include a transmit clock recovery circuit 903 and a receive clock recovery circuit 905. A transmit clock recovery circuit 903 may detect voltage transitions on lines TX− and TX+, and in response, output a periodic clock signal CLK_TX. Transmit clock recovery circuit 903 may include a variable clock circuit that may have a phase or frequency that is adjustable in response to detected transitions in TX− and TX+. In the very particular embodiment shown, such a variable clock circuit may be a phase lock loop (PLL). However, other embodiments may include other related circuits, including but not limited to a delay lock loop (DLL), as but one example. In a similar fashion to transmit clock recovery circuit 903, receive clock recovery circuit 905 may include a variable clock circuit that may have a phase or frequency that is adjustable in response to detected transitions in RX− and RX+. In the very particular embodiment shown, such a variable clock circuit may be a phase lock loop (PLL). However, other embodiments may include other related circuits, including but not limited to a delay lock loop (DLL), as but one example.

In this way, a function circuit may generate one or more clock signals based on transitions in data values along a uni-directional data path between an upstream port and a downstream port, where such a uni-directional data path bypasses a data transfer section for bi-directional signal paths.

It is noted that functions shown in FIGS. 6 to 9B, and their equivalents, may be included individually, or in combination, in the various embodiments shown herein.

Figure 10:
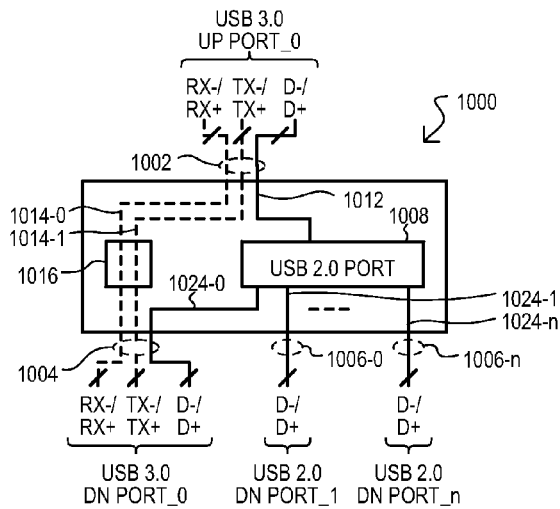
FIG. 10 is a block schematic diagram of a hub device according to an embodiment.

Referring now to FIG. 10, a device according to another embodiment is shown in a block schematic diagram and designated by the general reference character 1000. In one very particular embodiment, a device 1000 may be one particular example of that shown in any of FIGS. 1 to 5.

A device 1000 may include some items like those shown in FIG. 1. Such like items are referred to by the same reference character but with a first digit being a "10" instead of a "1".

The embodiment of FIG. 10 shows a hub device 1000 that may have an upstream port 1002 compatible with at least the universal serial bus (USB) 3.0 specification, a downstream port 1004 compatible with at least the USB 3.0 specification, and a number of other downstream ports 1006-1 to 1006-*n* compatible with the USB 2.0 standard, but not compatible with the USB 3.0 standard. The USB 3.0 standard is described in The Universal Serial Bus 3.0 Specification, Revision 1.0, by Hewlett-Packard Company et al., promulgated by the USB Implementers Forum, Inc., having office's at 5440 SW Westgate Dr., Portland, Oreg., 94221, and issued Nov. 12, 2008. The contents of this Specification are incorporated by reference herein.

In the particular embodiment shown, upstream port 1002 may include connections for a two-wire bi-directional signal path D−/D+ 1012 as well as two-wire un-directional signal paths RX−/RX+ 1014-0 and TX−/TX+ 1014-1. Uni-directional signal paths RX−/RX+, TX−/TX+ (1014-1/0) may be split off from bi-directional signal path D−/D+ 1012 and pass directly, or optionally indirectly through function circuit 1016, to downstream port 1004. A function circuit 1016 may perform predetermined operations on second signal path 1014 including, without limitation, those noted for function circuit 116 of FIG. 1 and equivalents.

Bi-directional signal path D−/D+ 1012 may be connected between upstream port 1002 and data transfer section 1008, which in this particular embodiment, may include a USB 2.0 hub circuit. A USB 2.0 hub circuit may be a circuit operating as a hub device defined by the USB 2.0 specification. Accordingly, data transfer section 1008 may manage connections between bi-directional signal path D−/D+ and downstream bi-directional data paths 1024-0 to 1024-*n*. However, as shown in FIG. 10, downstream bi-directional data path 1024-0 may be re-combined with uni-directional signal paths RX−/RX+, TX−/TX+ (1014-1/0) to create a USB 3.0 compatible downstream port 1004. In contrast, downstream ports 1006-1 to 1006-*n* may not be connected to uni-directional signal paths RX−/RX+, TX−/TX+ (1014-1/0), and thus may not be USB 3.0 compatible.

Figure 11:
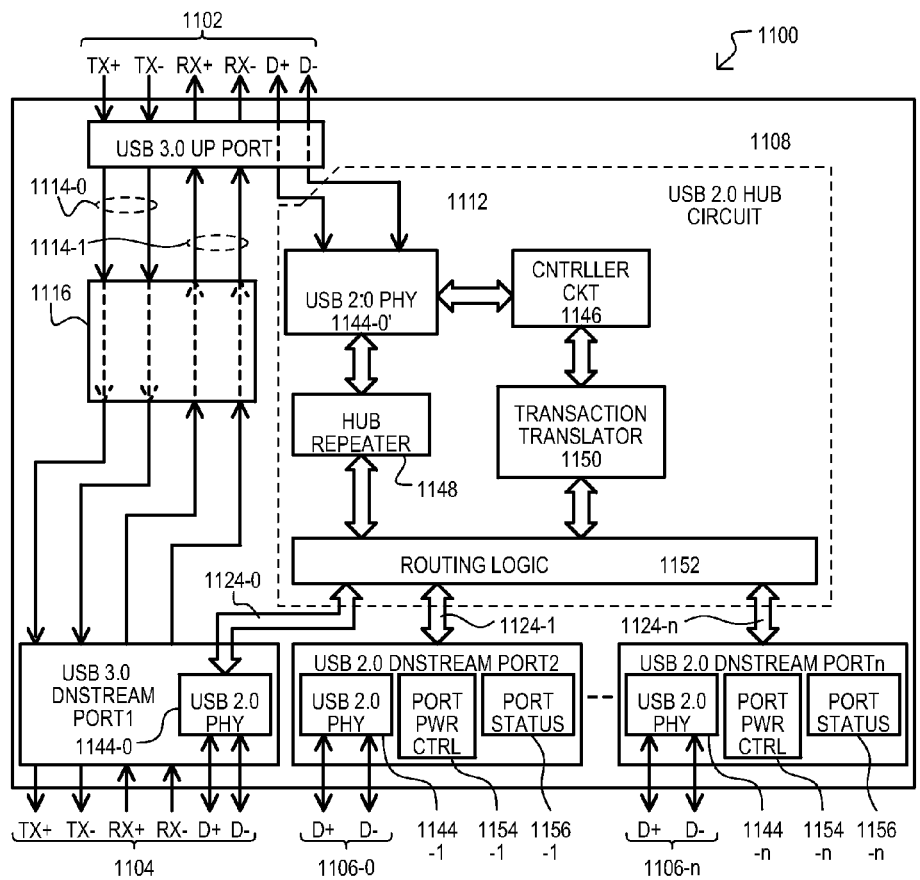
FIG. 11 is a block schematic diagram of another hub device according to one embodiment.

Referring now to FIG. 11, a device according to another embodiment is shown in a block schematic diagram and designated by the general reference character 1100. In one very particular embodiment, a device 1100 may be one particular example of that shown in any of FIGS. 1 to 5 or 10.

A device 1100 may include some items like those shown in FIG. 10. Such like items are referred to by the same reference character but with a first two digits being "11" instead of "10".

Referring still to FIG. 11, a data transfer section 1008 may be a USB 2.0 compatible hub, and may include an upstream physical layer circuit 1144-0', a controller circuit 1146, a hub repeater 1148, a transaction translator 1150, and routing logic 1152. An upstream physical layer (PHY) circuit 1144-0' may provide an interface for transferring data between bi-directional differential data connection D+/D− and a controller circuit 1146 and/or a hub repeater 1148. It is noted that while the particular embodiment of FIG. 11 shows one transaction translator 1150, alternate embodiments may include multiple transaction translators, each dedicated to a different port. That is alternate embodiments may include other USB 2.0 compatible hub architectures.

A hub repeater 1148 may establish and control transfers of data along bi-directional data paths D−/D+ between upstream port 1002 and any of downstream ports 1004, 1006-1 to 1006-*n* operating at a same speed as data path D−/D+ of upstream port 1002.

A controller circuit 1146 and transaction translator 1150 may establish and control transfers of data along bi-directional data paths D−/D+ between upstream port 1002 and any of downstream ports 1004, 1006-1 to 1006-n that are not operating at a same speed as data path D−/D+ of upstream port 1002.

Routing logic 1152 may selectively enable data paths between hub repeater 1148 and transaction translator 1150 to any of downstream bi-directional data paths 1124-0 to 1124-n.

Each of downstream ports 1106-1 to 1106-n may include a PHY circuit 1144-1 to 1144-n, a power control circuit 1154-1 to 1154-n, and a port status circuit 1156-1 to 1156-n. A PHY circuit (1144-1-n) may provide an interface for transferring data between routing logic 1152 and downstream bi-directional differential data connection D−/D+ of the corresponding downstream port.

A power control circuit 1154 may control a power output provided at the corresponding downstream port. A port status circuit 1152 may provide an output for indicating a status of the corresponding downstream port.

Each of downstream ports 1106-1 to 1106-n may be compatible with the USB 2.0 standard.

Downstream port 1104 may provide receive uni-directional signal path RX−/RX+ from a downstream direction (e.g., from an endpoint device), provide uni-directional signal path TX−/TX+ in a downstream direction, and provide a bi-directional signal path (DX−/DX+). In particular embodiments, a downstream port 1104 may include a PHY circuit 1144-0 for providing an interface for bi-directional DX−/DX+ path and an endpoint device. Downstream port 1104 may be compatible with the USB 3.0 standard.

In these ways, a USB hub may be formed that splits USB 3.0 particular upstream data paths away from USB 2.0 particular data paths. USB 2.0 particular data paths may be connected to a USB 2.0 hub, which may have one downstream data path that recombines with the USB 3.0 particular data path to create a downstream USB 3.0 port, and other downstream paths connected to USB 2.0 ports.

Figure 12:
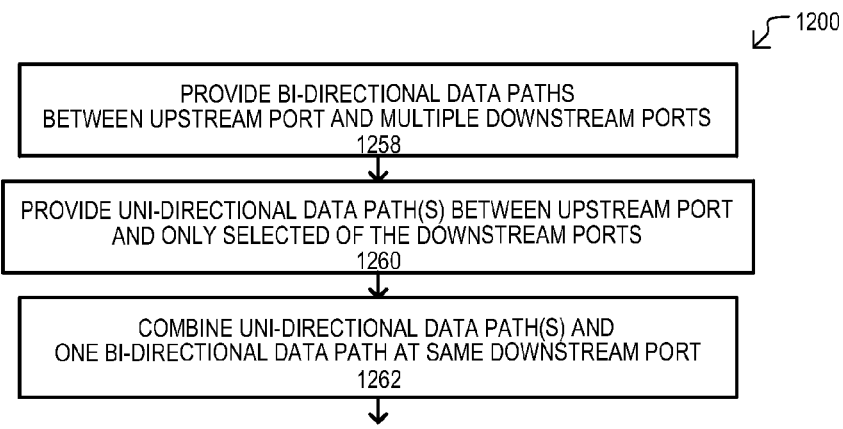
FIG. 12 is a flow diagram of a method according to one embodiment.

Referring to FIG. 12, a method according to an embodiment is shown in a flow diagram and designated by the general reference character 1200.

A method 1200 may include providing bi-directional data paths between an upstream port and multiple downstream ports (box 1258). Such an action may include enabling a transfer of data from a direction of a host device to any of multiple directions toward end point devices, as well as enabling a transfer of data from multiple end point device directions toward a host along same bi-directional data channels.

A method 1200 may also include providing one or more uni-directional paths between an upstream port and only selected of downstream ports (box 1260). Such an action may include enabling one-way transfers from an upstream port to a downstream port, enabling one-way transfers from a downstream port to an upstream port, or allowing both types of transfers along separate data channels.

A method 1200 may further include combining uni-directional data paths with one bi-directional data path at a same downstream port (box 1262). Such an action may create a downstream port having the same data paths as an upstream port, while other downstream ports have only a portion of the data paths of the upstream port.

In this way, a method may connect a bi-directional data path at an upstream port to multiple downstream data paths, but connect one or more unidirectional data paths at the upstream port to a smaller number of downstream ports.

Figure 13:
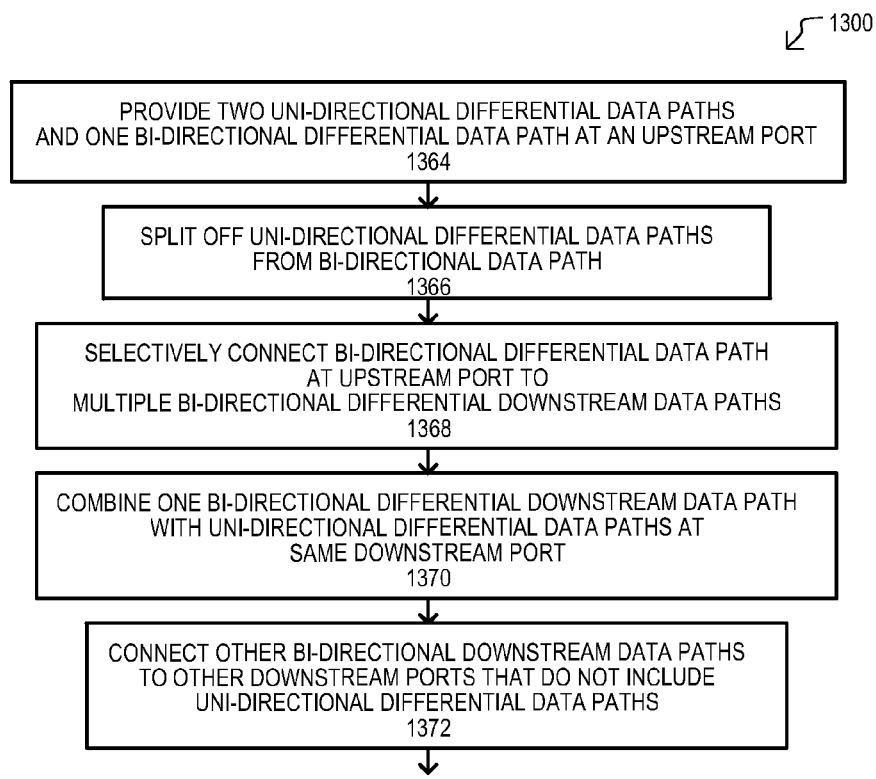
FIG. 13 is a flow diagram of a method according to another embodiment.

FIG. 13 is a flow diagram of another method 1300 according to an embodiment. A method 1300 may include providing two uni-directional differential data paths and one bi-directional differential data path at an upstream port (box 1364). Uni-directional differential data paths may be split-off from the bi-directional differential data path (box 1366). A bi-directional differential data path may be selectively connected to multiple bi-directional differential downstream data paths (box 1368).

One of the downstream bi-directional differential downstream data paths may be combined with the uni-directional data paths at a same downstream port (box 1370). Other of the downstream bi-directional data paths may be connected to other downstream ports that do not include uni-directional differential data paths (box 1372). Such actions may create one downstream port that includes both the uni-directional data paths and a bi-directional data path, and other downstream ports that include bi-directional data paths, but not uni-directional data paths.

Figure 14:
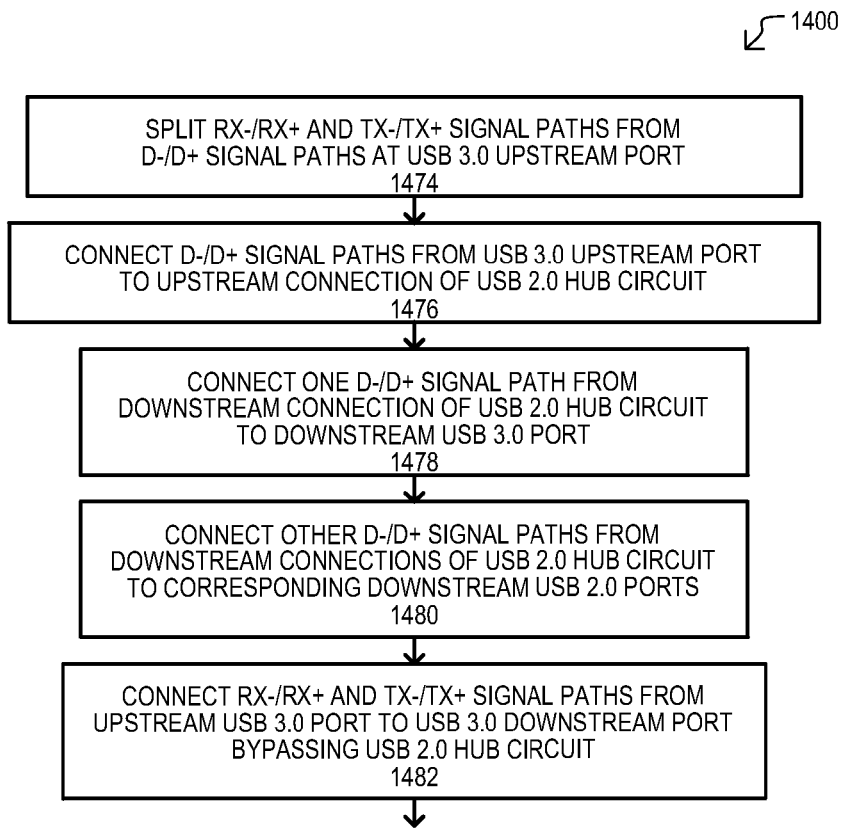
FIG. 14 is a flow diagram of a method according to a further embodiment.

FIG. 14 is a flow diagram of a method 1400 according to still another embodiment. A method 1400 may create a USB 3.0 downstream port and a number of USB 2.0 downstream ports from a same USB 3.0 upstream port.

In the particular embodiment of FIG. 14, a method 1400 may include splitting a uni-directional two-wire receive signal path RX−/RX+ and a uni-directional two-wire transmit path TX−/TX+ from a bi-directional two-wire signal path DX−/DX+ (box 1474). Such a splitting of signal paths may occur at an upstream USB 3.0 port. Such an action may include physically running signal lines to separate destinations (e.g., RX−/RX+ and TX−/TX+ being run to a different location than D−/D+).

A method 1400 may also include connecting D−/D+ signal paths from a USB 3.0 upstream port, to an upstream connection of a USB 2.0 hub circuit (box 1476). Such an action may include maintaining signals in differential form (e.g., a D− line and a D+ line) as they are applied to such a hub circuit, or alternatively, may include converting data received in differential form to single-ended form prior to connecting the data to a USB 2.0 upstream connection. In the latter case, a USB 2.0 hub circuit may not include a PHY circuit (as one may already be present in a USB 3.0 upstream port).

A method 1400 may further include connecting one D−/D+ signal path from a downstream connection of USB 2.0 hub circuit to a downstream USB 3.0 port (box 1478). Such an action may include applying a two-line differential signal (e.g., D−/D+) to a USB 3.0 port. Alternatively, such an action may include applying single-ended data originating from a D−/D+ input to a downstream USB 3.0 port. Within such a downstream USB 3.0 port, a PHY circuit may convert such single-ended values into differential signals (D−/D+).

A method 1400 may also include connecting other D−/D+ signal paths from downstream connections of the USB 2.0 hub circuit to corresponding downstream USB 2.0 ports (box 1480). Such an action may include variations noted for box 1478. In particular, signals provided at downstream connections of USB 2.0 hub may be single-ended and then converted to differential signals, or may be output in differential form from USB 2.0 hub circuit A method 1400 may further include connecting RX−/RX+ and TX−/TX+ signal paths from upstream USB 3.0 port to downstream USB 3.0 port, bypassing the USB 2.0 hub circuit (box 1482). Such an action may create a hub device having a USB 3.0 upstream portion, one USB 3.0 downstream port, and multiple USB 2.0 downstream ports. Such a bypassing path may include predetermined functions such as those noted in the above embodiments, and equivalents.

It should be appreciated that in the foregoing description of exemplary embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that an invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments may be practiced in the absence of an element and/or step not specifically disclosed. That is, a feature of an embodiment may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A device, comprising:
   a first data path coupled between a first port and a data transfer section, the data transfer section enabling data transfer paths between the first data path and at least a second port and a third port; and
   a second data path coupled between the first port and the second port that bypasses the data transfer section and is not coupled to the third port, wherein the second data path includes a function circuit configured to perform at least one operation to data signals input on the first port for output on the second port, and wherein the function circuit is not coupled to the third port.

2. The device of claim 1, wherein:
   the second data path comprises at least one unidirectional data path.

3. The device of claim 2, wherein:
   the second data path includes
   a second path input coupled to receive differential data values on two separate input lines, and
   a second path output coupled to provide differential values on two separate output lines.

4. The device of claim 1, wherein:
   the second data path comprises
   a transmit uni-directional path that transfers data from the first port to the second port, and
   a receive uni-directional data path that transfers data from the second port to the first port.

5. The device of claim 1, wherein:
   the first data path comprises a bidirectional path; and
   the data transfer section enables bidirectional data transfer paths between at least the second data path and the second and third ports.

6. The device of claim 1, wherein:
   the function circuit includes at least one signal amplifier that amplifies data values transmitted through the second data path.

7. The device of claim 1, wherein:
   the second data path includes at least two second signal path conductive lines, and
   the function circuit includes at least one programmable impedance array coupled to each second signal path conductive line.

8. The device of claim 1, wherein:
   the function circuit includes
   an input differential amplifier that amplifies input differential data values on a pair of second data path inputs to provide an internal single-ended data value, and
   an output differential driver having an input coupled to receive the single-ended data value and convert such a value into output differential data values on a pair of second data path outputs.

9. The device of claim 8, wherein:
   the function circuit includes at least one data latch coupled between the input differential amplifier and the output differential driver.

10. The device of claim 1, wherein:
    the second data path includes at least two second signal path conductive lines, and
    the function circuit includes a connection detect circuit coupled to the two second signal path conductive lines that generates a connection detect value in response to predetermined signal levels on the two second path conductive lines.

11. The device of claim 1, wherein:
    a first data path comprises a two wire bi-directional differential signaling path;
    the second data path comprises a transmit two wire-unidirectional differential signaling path and a receive two wire uni-directional differential signaling path; and
    the data transfer section includes a USB 2.0 compatible hub circuit, including
    a hub repeater that controls data transfers between the first port and at least the second and third ports based on such ports operating at a same data transfer speed,
    at least one transaction translator that controls data transfers between the first port and at least the second and third ports based on such ports operating at different data transfer speeds, and
    routing logic that enables data paths between the hub repeater and at least the second and third ports, and enables data paths between the transaction translator and at least the second and third ports.

12. A method of transferring data, comprising:
    passing data bi-directionally between an upstream port and a plurality of downstream ports;
    passing data unidirectionally between the upstream port and less than all of the downstream ports, wherein the passing of data bi-directionally and unidirectionally occurs at a same first downstream port; and
    performing an operation on the data passed unidirectionally between the upstream port and the less than all of the downstream ports with a function circuit coupled between the upstream port and the less than all of the downstream ports, wherein the operation includes amplifying signals input on the upstream port for output on the less than all of the downstream ports, establishing a signal line impedance between the upstream port and the less than all of the downstream ports, generating a connection indication in response to predetermined signal levels at the less than all of the downstream ports, or generating a clock signal based on the data passed between the upstream port and the less than all of the downstream ports.

13. The method of transferring data of claim 12, wherein:
    passing the data uni-directionally includes
    passing data on a first uni-directional data transmit path between the upstream port to and the first downstream port, and passing data on a second uni-directional data transmit path between the first downstream port and the upstream port.

14. The method of transferring data of claim 13, wherein:
passing data on the first unidirectional data transmit path includes providing a predetermined matching impedance on a first data transmit line and a second data transmit line.

15. The method of transferring data of claim 13, wherein:
passing data on the first unidirectional data transmit path includes
converting differential data signals received at the upstream port into an internal single ended data signal, and
converting the internal single ended signal into differential data output signals at the first downstream port.

16. The method of transferring data of claim 13, further including:
determining if the first unidirectional data transmit path is connected to a device by sensing predetermined voltage levels on the first unidirectional data transmit path.

17. A hub device, comprising:
an upstream port compatible with the universal serial bus (USB) 3.0 specification, configured to be coupled to a host device, that splits input lines into at least a first signal lines and a second signal lines;
an internal hub circuit having controllable data paths that selectively couple data on the first signal lines to at least a first downstream port and a second downstream port, wherein the internal hub circuit comprises a hub circuit compatible with the USB 2.0 specification, the first downstream port is compatible with the USB 3.0 specification, and the second downstream port is compatible with the USB 2.0 specification and not the USB 3.0 specification; and
a bypass signal path that couples data on the second signal lines to the first downstream port and not the second downstream port; wherein
the first and second downstream ports are configurable to be coupled to endpoint devices controllable by the host device.

18. The hub device of claim 17, wherein:
the first signal lines include
a first transmit pair that transmits data from the host device to an endpoint device and not from the endpoint device to the host device, and
a second transmit pair that transmits data from an endpoint device to the host device and not from the host device to an endpoint device; and
the second lines include a bi-directional pair that transmits data between the host device and the endpoint devices.

19. The hub device of claim 17, wherein:
the bypass signal path includes circuits selected from the group of:
signal amplifiers that amplify at least signals input on the upstream port for output on the first downstream port, variable impedance circuits that establish a signal line impedance between the upstream port and the first downstream port, a signal detect circuit that generates a connection indication in response to predetermined signal levels at the first downstream port, or clock recovery circuits that generate a clock signal based on data transition on the bypass signal path.

20. The hub device of claim 17, wherein:
the bypass signal path is coupled between the second signal lines and the first downstream port and includes a connection detect circuit to generate a connection detect value in response to predetermined signal levels.

\* \* \* \* \*